Jan. 30, 1934.　　　　G. M. WALKER　　　　1,945,169

TRACTOR

Filed April 24, 1933

INVENTOR.
GERALD M. WALKER
BY
ATTORNEY.

Patented Jan. 30, 1934

1,945,169

UNITED STATES PATENT OFFICE 1,945,169

TRACTOR

Gerald M. Walker, Peoria, Ill., assignor to Caterpillar Tractor Co., San Leandro, Calif., a corporation of California Application April 24, 1933. Serial No. 667,525

8 Claims. (Cl. 180—77)

The present invention relates to tractors and more particularly to a tractor seat construction which provides complete freedom of movement for the operator in observing and controlling operation of the tractor and the vehicle drawn thereby.

It is an object of the invention to provide a seat construction for tractors which facilitates operation of the tractor.

Another object of the invention is to provide a tractor having an operator's compartment constructed to provide complete freedom of movement for the operator in observing and controlling operation of the tractor and the vehicle drawn thereby.

Another object of the invention is to provide a tractor having an operator's compartment including a seat of a width substantially greater than the width of the operator's torso whereby the operator can slide from one side to another on the seat to observe and control operation of the tractor and a vehicle drawn thereby, the back of the seat having a width at the top substantially narrower than the width of the seat to provide complete freedom of movement for the operator.

Another object of the invention is to provide a tractor having an operator's compartment with a seat including a back having its upper corners spaced substantially within the sides of the seat to provide freedom of movement for the tractor operator in turning to manipulate tractor controls located forwardly of the seat, and to manipulate auxiliary controls located rearwardly of the seat.

Another object of the invention is to provide a tractor having an operator's compartment with controls located at a plurality of sides thereof and a seat at one of the sides thereof, the back of said seat having its upper corners cut away to provide freedom of movement for the operator in turning from controls at one side of the compartment to controls at another side thereof.

Another object of the invention is to provide a tractor having an operator's compartment including a seat arranged at one side thereof, tractor and auxiliary mechanism controls being positioned to either side of the seat, the back of the seat having a width at the top substantially less than the width of the seat.

Other objects will appear as the description progresses.

Description of mechanism

Figure 1:
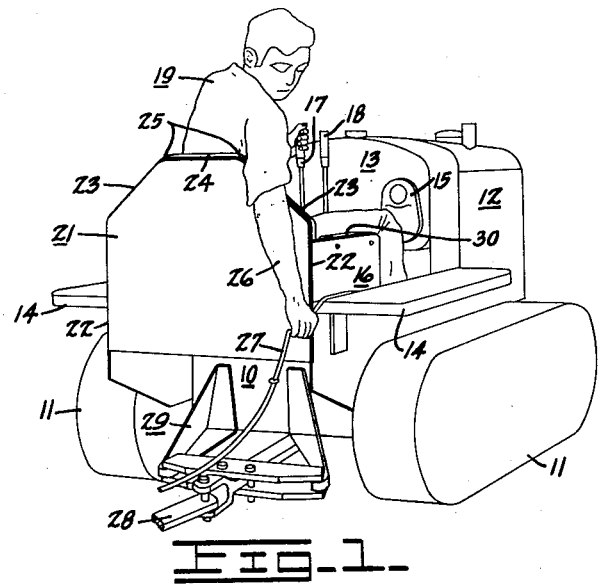
Fig. 1 is a perspective view illustrating the invention as embodied in a conventional tractor.

The invention is disclosed herein as embodied in a track-type tractor comprising main frame or body portion 10 (Fig. 1) supported on endless track mechanisms 11. Engine 12 is located at the front of the tractor, and fuel tank 13 positioned behind said engine 12 serves as a dash to close the front of an operator's compartment formed thereby, with fenders 14 and seat 16. Instrument panel 15 on tank 13 supports the ignition switch and other engine controls. Levers 17, 18 for controlling operation of the tractor are located at said operator's station conveniently to operator 19 seated in seat 16.

The operator's seat is constructed to promote efficient operation of the tractor by the operator, and to provide easy access to the tractor controls, and to controls for auxiliary mechanism drawn by the tractor. As it is often necessary for the operator to turn in his seat to observe operation of the drawn vehicle, or to reach toward the rear of the tractor to control operation of such vehicle, the back of the tractor seat is cut away at the top to avoid interference with such turning and reaching back by the operator.

Seat 16 has a width substantially greater than the operator's torso so that the operator can slide to one side or the other as required in observing and controlling operation of the tractor and/or the drawn vehicle. Seat 16 has back 21, having vertical sides 22 joined by slanted or cut-away portions 23 to horizontal top 24 providing upper corners 25 spaced substantial distances within sides 22. In Fig. 1, operator 19 is shown reaching back with arm 26 to grasp cord 27, which is adapted to control operation of a drawn vehicle including draft pole 28 connected to drawbar 29 on frame 10. It is to be noted that sides 30 of seat 16 provide arm rests for the operator, having their tops adjacent the lower ends of cutaway portions 23 of back 21. It is believed obvious that the cut-away seat construction not only aids the operator in turning to observe or control operation of a drawn vehicle, but also permits free use of the arms to operate levers 17, 18 without danger of injury to the operator by striking of the elbows against the back of the seat. Such striking would also interfere with control of the tractor. Because of the cut-away seat construction, the operator can assume a more natural position while controlling the tractor, and he becomes less tired and hence can control tractor operation more efficiently.

Figure 2:
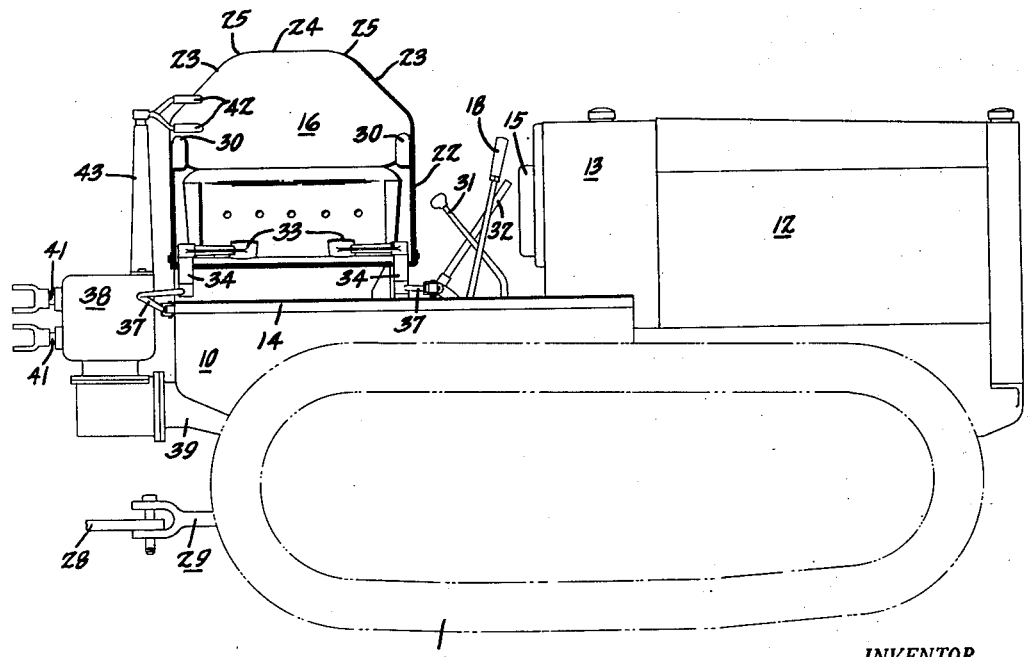
Fig. 2 is a right side elevation of a tractor having a side seat arrangement mounted thereon embodying the instant invention.

In Fig. 2, the invention is disclosed as embodied in a tractor having a side seat arrangement, which is employed when the operator must constantly observe and control the operation of the drawn vehicle, as, for example, a road maintenance machine. In this view, steering clutch control levers 17, 18 (only one of which is seen) are to the left of the operator, together with gear shift lever 31 and main clutch control lever 32. Brake extension pedals 33, pivotally mounted at 34 on suitable frame work extending upwardly from right-hand fender 14, are connected by means including arms 37 to the conventional brake pedals (not shown). To the right of seat 16 at the rear of the tractor a double power take-off is provided, including housing 38 mounted on body portion 10 by bracket 39. Shafts 41 extending rearwardly from housing 38 provide selective clutch-controlled drives to the drawn vehicle as determined by control levers 42 mounted in bracket 43 on housing 38, and positioned adjacent seat 16.

Thus, it is seen that in the second form of the invention, controls are provided at the front end of the seat (to the left of the operator) for controlling tractor operation and controls are provided at the rear end of the seat (to the right of the operator) for controlling operation of auxiliary mechanisms to the rear of the tractor on a drawn vehicle. With the back of seat 16 cut away as at 23 the operator can turn toward the front end of the tractor or toward the rear end of the tractor as the occasion demands and operate the tractor controls or auxiliary controls without interference, such as would occur with a tractor seat having a full width back at the top. As the operator is unhampered in controlling operation of the tractor and of the drawn vehicle, more efficient work results and the operation of the entire vehicle train is rendered faster, more satisfactory, and hence more economical.

I, therefore, claim as my invention:

1. In a tractor adapted for use in pulling a drawn vehicle having means thereon to be controlled from the tractor by the tractor operator, a body portion, an operator's compartment on said body portion, including a dash closing the front of said compartment, fenders closing the sides of said compartment, a seat closing the rear of said compartment, and tractor controls in said compartment, said seat having a back, the top of said back being of less width than said seat whereby the operator can turn in said seat without interference from said back.

2. In a tractor adapted for use in pulling a drawn vehicle having means thereon to be controlled from the tractor by the tractor operator, a body portion, an operator's compartment on said body portion, including a dash closing the front of said compartment, fenders closing the sides of said compartment, a seat closing the rear of said compartment, and tractor controls in said compartment, said seat having a back with cut-away corners at the top, the contour of said back otherwise being substantially rectangular.

3. In a tractor adapted for use in pulling a drawn vehicle having means thereon to be controlled from the tractor by the tractor operator, an operator's compartment, including a seat, and controls on three sides of said compartment whereby the operator must turn in said seat in reaching from one control to another, said seat including a back having a top of substantially less width than said seat to provide freedom of movement for said operator in turning from a control on one side of said compartment to a control on another side of said compartment.

4. In a tractor adapted for use in pulling a drawn vehicle having means thereon to be controlled from the tractor by the tractor operator, an operator's compartment, including a seat, and controls on three sides of said compartment whereby the operator must turn in said seat in reaching from one control to another, said seat being located at the fourth side of said compartment and including a back having a top of substantially less width than said seat to provide freedom of movement for said operator in turning from a control on one side of said compartment to a control on another side of said compartment.

5. In a tractor adapted for use in pulling a drawn vehicle having means theeron to be controlled by the tractor operator, an operator's compartment on said tractor, including a seat located at one side of said compartment so that the sides of the seat are aligned longitudinally of said tractor, tractor controls at the front of said compartment adjacent the front side of said seat, and auxiliary controls for the drawn vehicle at the rear of said compartment adjacent the rear side of said seat, said seat including a back having cut-away corners at the top to provide freedom for the operator in turning from said tractor controls to said auxiliary controls.

6. In a tractor, a body portion, an operator's compartment on said body portion, including a dash forming the front wall thereof, fenders forming the side walls thereof, and a seat for the tractor operator forming the rear wall thereof; and tractor controls in said compartment, said seat including sides forming arm rests for the tractor operator, and a back having cut-away upper corners converging from points adjacent the tops of said sides, said cut-away corners providing freedom of movement for the tractor operator in observing and controlling operation of the tractor.

7. In a tractor, a body portion, an operator's compartment on said body portion, including a dash forming the front wall thereof, fenders forming the side walls thereof, and a seat for the tractor operator at said operator's compartment; and tractor controls in said compartment, said seat including sides forming arm rests for the tractor operator, and a back having cut-away upper corners converging from points adjacent the tops of said sides, said cut-away corners providing freedom of movement for the tractor operator in observing and controlling operation of the tractor.

8. In a tractor, a body portion, an operator's compartment on said body portion, including a dash forming the front wall thereof, fenders forming the side walls thereof, and a seat for the tractor operator forming the rear wall thereof; and tractor controls in said compartment, said seat including a back having cut-away upper corners converging upwardly, said cut-away corners providing freedom of movement for the tractor operator in observing and controlling operation of the tractor.

GERALD M. WALKER.